United States Patent [19]

Kobayashi et al.

[11] Patent Number: 5,777,052

[45] Date of Patent: Jul. 7, 1998

[54] SILICONE MODIFIED VINYL POLYMERS AND METHOD FOR THE PREPARATION THEREOF

[75] Inventors: Hideki Kobayashi; Toru Masatomi, both of Chiba Prefecture, Japan

[73] Assignee: Dow Corning Toray Slicone Co., LTD., Tokyo, Japan

[21] Appl. No.: 886,123

[22] Filed: Jun. 30, 1997

[30] Foreign Application Priority Data

Jun. 28, 1996 [JP] Japan ............... 8-188886

[51] Int. Cl.$^6$ ............... C08F 30/08
[52] U.S. Cl. ............... 526/279
[58] Field of Search ............... 526/279

[56] References Cited

U.S. PATENT DOCUMENTS

| | | | |
|---|---|---|---|
| 4,933,406 | 6/1990 | Aran et al. | 526/279 |
| 5,194,542 | 3/1993 | Iwamoto et al. | 526/279 |
| 5,387,662 | 2/1995 | Kunzler et al. | 526/279 |
| 5,476,901 | 12/1995 | Smith et al. | 526/279 |

FOREIGN PATENT DOCUMENTS

| | | | |
|---|---|---|---|
| 1251882 | 3/1989 | Canada | 526/279 |
| 0392567 | 10/1990 | European Pat. Off. | 526/279 |
| 0494842 | 7/1992 | European Pat. Off. | 526/279 |
| 61-7360 | 1/1986 | Japan. | |
| 2-69507 | 3/1990 | Japan | 526/279 |

OTHER PUBLICATIONS

Ans. 1 of 3 Document 127:67574 Helmut et al DE 19543707 970528–In–House Computer Abstract pp. 2–5.
Ans. 2 of 3 Document 122:33631 Yasuhiro JP06025599 940201–In–House Computer Abstract pp. 5–6.
Ans. 3 of 3 Document 119:226192 Hiroshi et al JP92–78499 920228–In–House Computer Abstract pp. 6–7.

*Primary Examiner*—Joseph L. Schofer
*Assistant Examiner*—N. Sarofim
*Attorney, Agent, or Firm*—Timothy J. Troy

[57] ABSTRACT

This invention relates to a silicone-modified vinyl polymer having a weight-average molecular weight from 1,000 to 1,000,000 containing a siloxane group having the formula $$(-R_aSiO_{(3-a)/2})(F(CF_2)_b-R^4-R_cSiO_{3-c/2})_x(R_dSiO_{(4-d)/2})_y(R^5O_{1/2})_z$$

wherein R denotes a monovalent hydrocarbon group free of unsaturated bonding. $R^4$ denotes an alkylene group or an alkyleneoxyalkylene group. $R^5$ denotes hydrogen or an alkyl group. a is an integer from 0 to 2, b is an integer with a value of at least 4, c is an integer from 0 to 2, d is an integer from 0 to 3, x is a number greater than 0, and y and z are each numbers with values of 0 or more. The polymers of this invention are useful in forming water repellent and oil repellent coatings.

15 Claims, No Drawings

SILICONE MODIFIED VINYL POLYMERS AND METHOD FOR THE PREPARATION THEREOF

BACKGROUND OF THE INVENTION

This invention relates to novel silicone-modified vinyl polymers and to methods for their preparation.

Silicone-modified vinyl polymers as afforded by the vinyl-polymerization of vinyl monomers and alkenyl-functional organosilicon compounds are known. For example, Japanese Patent Application Laid-Open No. 61-7360 (7,360/1986) teaches a copolymer produced by the emulsion polymerization of methacryloxymethyldimethoxysilane, methyl methacrylate, ethyl acrylate, and acrylic acid as a coating. Also taught in this reference as a coating is the compound produced by the addition of glycidoxytrimethoxysilane to the subject copolymer. However, silicone-modified vinyl polymers having a perfluoroalkyl group containing at least 4 carbon atoms bonded to silicon are heretofore unknown.

SUMMARY OF THE INVENTION

This invention relates to a silicone-modified vinyl polymer having a weight-average molecular weight from 1,000 to 1,000,000 containing a siloxane group having the formula

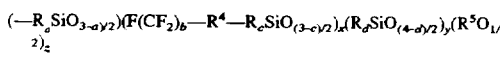

wherein R denotes a monovalent hydrocarbon group free of unsaturated bonding, $R^4$ denotes an alkylene group of alkyleneoxyalkylene group, $R^5$ denotes hydrogen or an alkyl group, a is an integer from 0 to 2, b is an integer with a value of at least 4, c is an integer from 0 to 2, d is an integer from 0 to 3, x is a number greater than 0, and y and z are each numbers with values of 0 or more.

This invention also relates to methods for the preparation of the above-described silicone-modified vinyl polymer.

It is an object of the present invention to provide a novel silicon-modified vinyl polymer and methods for the preparation thereof.

DETAILED DESCRIPTION OF THE INVENTION

This invention relates to silicone-modified vinyl polymers comprising units having the formula:

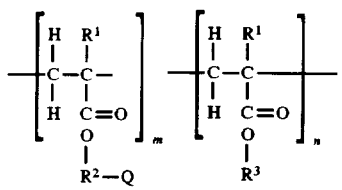

wherein $R^1$ is selected from the group consisting of hydrogen and an alkyl group, $R^2$ denotes a divalent hydrocarbon group, $R^3$ is selected from the group consisting of hydrogen, a substituted monovalent hydrocarbon group, and an unsubstituted monovalent hydrocarbon group, Q is a siloxane group having the formula

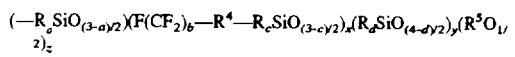

wherein R denotes a monovalent hydrocarbon group free of unsaturated bonding, $R^4$ is selected from the group consisting of an alkylene group and alkyleneoxyalkylene group, $R^5$ is selected from the group consisting of hydrogen and an alkyl group, a is an integer from 0 to 2, b is an integer with a value of at least 4, c is an integer from 0 to 2, d is an integer from 0 to 3, x is a number greater than 0, y and z are each numbers with values of 0 or more, and m and n are each numbers from 1 to 10,000.

In the silicone modified vinyl polymer delineated above, the alkyl groups of $R^1$ are exemplified by methyl, ethyl, propyl, and butyl. The divalent hydrocarbon group of $R^2$ is exemplified by alkylene groups such as methylene, ethylene, and propylene. The unsubstituted hydrocarbon group of $R^3$ is exemplified by alkyl groups such as methyl, ethyl, propyl, and butyl, and the substituted hydrocarbon group of $R^3$ is exemplified by hydroxyalkyl groups such as 2-hydroxypropyl.

In the formula for the siloxane group Q, R denotes a monovalent hydrocarbon group that is free of unsaturated bonding exemplified by alkyl groups such as methyl, ethyl, propyl, butyl, pentyl, hexyl, heptyl, octyl, nonyl, decyl, hexadecyl, and octadecyl, and aryl groups such as phenyl. The alkylene groups of $R^4$ are exemplified by ethylene, methylethylene, ethylethylene, propylethylene, butylethylene, propylene, butylene, 1-methylpropylene, pentylene, hexylene, heptylene, octylene, nonylene, and decylene, and the alkyleneoxyalkylene groups of $R^4$ are exemplified by ethyleneoxyethylene, ethyleneoxypropylene, ethyleneoxybutylene, propyleneoxyethylene, propyleneoxypropylene, propyleneoxybutylene, butyleneoxyethylene, and butyleneoxypropylene. The alkyl groups of $R^5$ are exemplified by methyl, ethyl, propyl, butyl, and pentyl. The subscript a is an integer from 0 to 2 and preferably has a value of 0. The subscript b is an integer with a value of at least 4 and preferably from 4 to 12 and is exemplified by 4, 6, and 8. The subscript c is an integer from 0 to 2 and preferably has a value of 0, and d is an integer with a value from 0 to 3. The subscript x is a number greater than 0, and y and x are each numbers with a value of 0 or greater.

In the silicone-modified vinyl polymer, the subscripts m and n are each numbers from 1 to 10,000 and preferably from 10 to 1,000. The ratio of m:n is preferably from 100:1 to 1:100. The silicone-modified vinyl polymer according to the present invention should have a weight-average molecular weight from 1,000 to 1,000,000 and preferably from 5,000 to 100,000. The molecular chain terminals of this polymer will generally be endlocked by a residue from the radical polymerization initiator used during syntheses, a carbon-carbon double bond generated by disproportionation reactions, or a hydrogen atom abstracted, for example, from the solvent.

The siloxane unit denoted by Q is preferably selected from the group consisting of

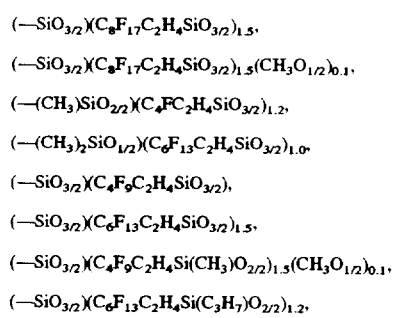

$(-SiO_{3/2})(C_8F_{17}C_2H_4Si(CH_3)O_{2/2})_{1.5}$, $(-SiO_{3/2})(C_6F_{13}C_3H_6SiO_{3/2})_{1.5}$, $(-SiO_{3/2})(C_4F_9CH_2OC_2H_4SiO_{3/2})_{1.5}(C_2H_5O_{1/2})_{0.1}$, $(-SiO_{3/2})(C_6F_{13}CH_2OC_3H_6SiO_{3/2})_{1.5}$, $(-SiO_{3/2})(C_8F_{17}C_2H_4OC_2H_4SiO_{3/2})_{1.5}$, $(-SiO_{3/2})(C_4F_9CH_2OC_2H_4Si(CH_3)O_{2/2})_{1.5}$, $(-SiO_{3/2})(C_6F_{13}CH_2OC_2H_4Si(CH_3)O_{2/2})_{1.2}$, $(-SiO_{3/2})(C_8F_{17}CH_2OC_2H_4Si(CH_3)O_{2/2})_{1.2}$, $(-SiO_{3/2})(C_4F_9C_2H_4Si(CH_3)_2O_{1/2})_3$, $(-SiO_{3/2})(C_6F_{13}C_2H_4Si(C_3H_7)(CH_3)O_{1/2})_3$, $(-SiO_{3/2})(C_6F_{13}C_3H_6Si(CH_3)O_{2/2})_1$, $(-SiO_{3/2})(C_4F_9C_2H_4SiO_{3/2})_{0.4}((CH_3)_2SiO_{2/2})_{0.6}$, $(-SiO_{3/2})(C_6F_{13}C_2H_4SiO_{3/2})_{0.5}(CH_3SiO_{3/2})_{0.5}(CH_3O_{1/2})_{0.1}$, $(-SiO_{3/2})(C_8F_{17}C_2H_4SiO_{3/2})_{0.2}(SiO_{4/2})_{0.4}((CH_3)_3SiO_{1/2})_{0.4}$, $(-SiO_{3/2})(C_4F_9C_2H_4Si(CH_3)O_{2/2})_{0.2}((C_6H_5)SiO_{3/2})_{0.8}$, $(-SiO_{3/2})(C_6F_{13}C_2H_4Si(C_3H_7)O_{2/2})_{0.3}((C_6H_5)_2SiO_{2/2})_{0.7}$, $(-SiO_{3/2})(C_8F_{17}C_2H_4Si(CH_3)O_{2/2})_{0.5}(CH_3SiO_{3/2})_{0.5}$, $(-SiO_{3/2})(C_6F_{13}C_3H_6SiO_{3/2})_{0.5}((C_6H_5)_2SiO_{2/2})_{0.5}$, $(-SiO_{3/2})(C_4F_9CH_2OC_2H_4SiO_{3/2})_{0.7}((CH_3)_3SiO_{1/2})_{0.3}$, $(-SiO_{3/2})(C_6F_{13}CH_2OC_3H_6SiO_{3/2})_{0.1}((CH_3)_3SiO_{1/2})_{0.45}(SiO_{4/2})_{0.45}(HO_{1/2})_{0.1}$, $(-SiO_{3/2})(C_8F_{17}C_2H_4OC_2H_4SiO_{3/2})_{0.4}((CH_3)_2SiO_{2/2})_{0.6}$, $(-SiO_{3/2})(C_4F_9CH_2OC_2H_4Si(CH_3)O_{2/2})_{0.5}((CH_3)SiO_{3/3})_{0.5}$, $(-SiO_{3/2})(C_6F_{13}CH_2OC_2H_4Si(CH_3)O_{2/2})_{0.5}((C_6H_5)SiO_{3/2})_{0.5}$, $(-SiO_{3/2})(C_8F_{17}C_2H_4SiO_{3/2})_{0.6}((CH_3)_2SiO_{2/2})_{0.9}$, and $(-SiO_{3/2})(C_8F_{17}CH_2OC_2H_4Si(CH_3)O_{2/2})_{0.5}((C_6H_5)_2SiO_{2/2})_{0.5}$.

The silicone-modified vinyl polymer according to this invention is preferably selected from the group consisting of (i) vinyl polymers comprising units having the formula:

$$\left[\begin{array}{c} H\ CH_3 \\ |\ \ | \\ -C-C- \\ |\ \ | \\ H\ C=O \\ \ \ \ | \\ \ \ \ O \\ \ \ \ | \\ \ \ (CH_2)_3 \end{array}\right]_{3p} \left[\begin{array}{c} H\ CH_3 \\ |\ \ | \\ -C-C- \\ |\ \ | \\ H\ C=O \\ \ \ \ | \\ \ \ \ O \\ \ \ \ | \\ \ \ CH_3 \end{array}\right]_{7p}$$

$(SiO_{3/2})(C_8F_{17}C_2H_4SiO_{3/2})_{1.5}$ (ii) vinyl polymers comprising units having the formula:

$$\left[\begin{array}{c} H\ CH_3 \\ |\ \ | \\ -C-C- \\ |\ \ | \\ H\ C=O \\ \ \ \ | \\ \ \ \ O \\ \ \ \ | \\ \ \ (CH_2)_3 \end{array}\right]_{3p} \left[\begin{array}{c} H\ CH_3 \\ |\ \ | \\ -C-C- \\ |\ \ | \\ H\ C=O \\ \ \ \ | \\ \ \ \ O \\ \ \ \ | \\ \ \ CH_3 \end{array}\right]_{7p}$$

$(SiO_{3/2})(C_4F_9C_2H_4SiO_{3/2})_{1.5}$ (iii) vinyl polymers comprising units having the formula:

$$\left[\begin{array}{c} H\ CH_3 \\ |\ \ | \\ -C-C- \\ |\ \ | \\ H\ C=O \\ \ \ \ | \\ \ \ \ O \\ \ \ \ | \\ \ \ (CH_2)_3 \end{array}\right]_{3p} \left[\begin{array}{c} H\ CH_3 \\ |\ \ | \\ -C-C- \\ |\ \ | \\ H\ C=O \\ \ \ \ | \\ \ \ \ O \\ \ \ \ | \\ \ \ CH_3 \end{array}\right]_{7p}$$

$(SiO_{3/2})(C_4F_9C_2H_4SiO_{3/2})_{0.6}(SiO_{2/2})_{0.9}$,
                                            |
                                           $CH_3$ (iv) vinyl polymers comprising units having the formula:

$$\left[\begin{array}{c} H\ CH_3 \\ |\ \ | \\ -C-C- \\ |\ \ | \\ H\ C=O \\ \ \ \ | \\ \ \ \ O \\ \ \ \ | \\ \ \ (CH_2)_3 \end{array}\right]_{3p} \left[\begin{array}{c} H\ CH_3 \\ |\ \ | \\ -C-C- \\ |\ \ | \\ H\ C=O \\ \ \ \ | \\ \ \ \ O \\ \ \ \ | \\ \ \ CH_3 \end{array}\right]_{7p}$$

$(SiO_{3/2})(C_4F_9CH_2OC_2H_4SiO_{3/2})_{1.5}$, (v) vinyl polymers comprising units having the formula:

$$\left[\begin{array}{c} H\ CH_3 \\ |\ \ | \\ -C-C- \\ |\ \ | \\ H\ C=O \\ \ \ \ | \\ \ \ \ O \\ \ \ \ | \\ \ \ (CH_2)_3 \end{array}\right]_{3p} \left[\begin{array}{c} H\ CH_3 \\ |\ \ | \\ -C-C- \\ |\ \ | \\ H\ C=O \\ \ \ \ | \\ \ \ \ O \\ \ \ \ | \\ \ \ CH_3 \end{array}\right]_{7p}$$

$(SiO_{3/2})(C_6F_{13}CH_2OC_2H_4(CH_3)SiO_{2/2})_{1.5}$, (vi) vinyl polymers comprising units having the formula:

$$\left[\begin{array}{c} H\ CH_3 \\ |\ \ | \\ -C-C- \\ |\ \ | \\ H\ C=O \\ \ \ \ | \\ \ \ \ O \\ \ \ \ | \\ \ \ (CH_2)_3 \end{array}\right]_{3p} \left[\begin{array}{c} H\ CH_3 \\ |\ \ | \\ -C-C- \\ |\ \ | \\ H\ C=O \\ \ \ \ | \\ \ \ \ O \\ \ \ \ | \\ \ \ CH_3 \end{array}\right]_{7p}$$

$(CH_3SiO_{2/2})(C_4F_9CH_2OC_2H_4SiO_{3/2})_{1.0}$, (vii) vinyl polymers comprising units having the formula:

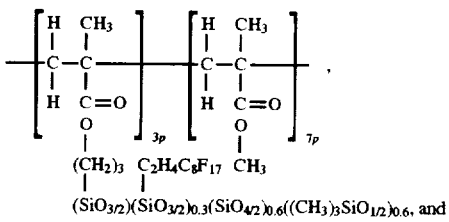

(SiO$_{3/2}$)(SiO$_{3/2}$)$_{0.3}$(SiO$_{4/2}$)$_{0.6}$((CH$_3$)$_3$SiO$_{1/2}$)$_{0.6}$, and (viii) vinyl polymers comprising units having the formula:

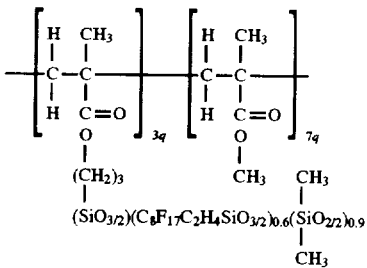

(SiO$_{3/2}$)(C$_8$F$_{17}$C$_2$H$_4$SiO$_{3/2}$)$_{0.6}$(SiO$_{2/2}$)$_{0.9}$
|
CH$_3$ wherein p is an integer having a value of at least 1 and q is an integer having a value of at least 1.

The silicone-modified vinyl polymer according to this invention can be prepared, for example, by radically polymerizing (A) an acrylate monomer having the general formula CH$_2$=CR$^1$COOR$^3$ and (B) an acryloxy-functional alkoxysilane with the general formula CH$_2$=CR$^1$COO—R$^2$—R$_a$Si(OR$^6$)$_{3-a}$ and then combining the resulting prepolymer with (C) a perfluoroalkyl-functional alkoxysilane with the general formula F(CF$_2$)$_b$—R$^4$—R$_c$Si(OR$^6$)$_{3-c}$ and optionally (D) an alkoxysilane having the general formula R$_d$Si(OR$^6$)$_{4-d}$ and effecting thereon partial hydrolysis and condensation.

The acyrylate monomer (A) has the general formula given above, and R$^1$ and R$^2$ in this formula are the same as described above. The acrylate monomer is exemplified by monoacrylate monomers such as acrylic acid, methacrylic acid, methyl acrylate, ethyl acrylate, tert-butyl acrylate, 2-hydroxyethyl acrylate, 2-hydroxypropyl acrylate, methyl methacrylate, ethyl methacrylate, n-butyl methacrylate, tert-butyl methacrylate, isobutyl methacrylate, glycidyl methacrylate, 2-hydroxyethyl methacrylate, 2-hydroxypropyl methacrylate, dimethylaminoethyl methacrylate, methoxydiethylene glycol acrylate, methoxydiethylene glycol methacrylate, methoxytetraethylene glycol methacrylate, and allyl methacrylate. A single specific acrylate monomer or combinations of two or more acrylate monomers can be used.

The acryloxy-functional alkoxysilane (B) has the general formula given above, and R$^1$, R$^2$, R, and a in this formula are the same as described above. R$^6$ represents a C$_1$ to C$_8$ alkyl group, for example, methyl, ethyl, propyl, butyl, pentyl, hexyl, heptyl, and octyl. The acryloxy-functional alkoxysilane under consideration is exemplified by γ-methacryloxypropyltrimethoxysilane, γ-acryloxypropyltrimethoxysilane, γ-methacryloxypropyltriethoxysilane, and γ-methacryloxypropytriisopropoxysilane. The acryloxy-functional alkoxysilane may be a single acryloxy-functional alkoxysilane or a combination of 2 or more acryloxy-functional alkoxysilanes.

The perfluoroalkyl-functional alkoxysilane (C) has the general formula given above, and R$^4$, R$^6$, R, b, and c in this formula are the same as described above. The perfluoroalkyl-functional alkoxysilane is preferably selected from the group consisting of C$_4$F$_9$C$_2$H$_4$Si(OCH$_3$)$_3$, C$_6$F$_{13}$C$_2$H$_4$Si(OCH$_3$)$_3$, C$_8$F$_{17}$C$_2$H$_4$Si(OCH$_3$)$_3$, C$_4$F$_9$C$_2$H$_4$Si(OC$_2$H$_5$)$_3$, C$_6$F$_{13}$C$_2$H$_4$Si(OC$_3$H$_7$)$_3$, C$_8$F$_{17}$C$_2$H$_4$Si(OC$_3$H$_7$)$_3$, C$_4$F$_9$C$_2$H$_4$Si(CH$_3$)(OCH$_3$)$_2$, C$_6$F$_{13}$C$_2$H$_4$Si(C$_3$H$_7$)(OCH$_3$)$_2$, C$_8$F$_{17}$C$_2$H$_4$Si(CH$_3$)(OCH$_3$)$_2$, C$_6$F$_{13}$C$_3$H$_6$Si(OCH$_3$)$_3$, C$_4$F$_9$CH$_2$OC$_2$H$_4$Si(OCH$_3$)$_3$, C$_6$F$_{13}$CH$_2$OC$_3$H$_6$Si(OCH$_3$)$_3$, C$_8$F$_{17}$C$_2$H$_4$OC$_2$H$_4$Si(OCH$_3$)$_3$, C$_4$F$_9$CH$_2$OC$_2$H$_4$Si(CH$_3$)(OCH$_3$)$_2$, C$_6$F$_{13}$CH$_2$OC$_2$H$_4$Si(CH$_3$)(OCH$_3$)$_2$, C$_8$F$_{17}$CH$_2$OC$_2$H$_4$Si(CH$_3$)(OCH$_3$)$_2$, C$_4$F$_9$C$_2$H$_4$Si(CH$_3$)$_2$(OCH$_3$), C$_6$F$_{13}$C$_2$H$_4$Si(C$_3$H$_7$)(CH$_3$)(OCH$_3$), and C$_6$F$_{13}$C$_3$H$_6$Si(CH$_3$)(OCH$_3$)$_2$. The perfluoroalkyl-functional alkoxysilane may be a single perfluoroalkyl-functional alkoxysilane or a combination of 2 or more perfluoroalkyl-functional alkoxysilanes.

The alkoxysilane (D) has the general formula given above, and R$^6$, R, and d in this formula are the same as described above. The alkoxysilane (D) is preferably selected from the group consisting of CH$_3$Si(OCH$_3$)$_3$, C$_6$H$_5$Si(OCH$_3$)$_3$, (CH$_3$)$_2$Si(OCH$_3$)$_2$, (C$_6$H$_5$)$_2$Si(OCH$_3$)$_2$, (CH$_3$)$_3$Si(OCH$_3$), (C$_6$H$_5$)$_3$Si(OCH$_3$), and Si(OCH$_3$)$_4$. The alkoxysilane may be a single alkoxysilane or a combination of 2 or more alkoxysilanes.

The radical polymerization of the acrylate monomer (A) and acryloxy-functional alkoxysilane (B) is preferably carried out by mixing the compounds in a solvent and then reacting them using a radical polymerization initiator. Suitable radical polymerization initiators are exemplified by organoperoxides such as benzoyl peroxide, dichlorobenzoyl peroxide, di-tert-butyl peroxide, 2,5-di(peroxybenzoate) hex-3-yne, 1,3-bis(tert-butylperoxyisopropyl)benzene, and tert-butyl perbenzoate, and by azo compounds such as azobisisobutyronitrile and dimethylazobutyrate. The silicone-modified vinyl polymer according to this invention can be prepared by combining the prepolymer afforded by the radical polymerization with the perfluoroalkyl-functional alkoxysilane (C) and optionally with the alkoxysilane (D) and effecting thereon partial hydrolysis and condensation. The procedure for this hydrolysis is exemplified by (i) dissolution of a mixture of the prepolymer and alkoxysilane(s) in an organic solvent followed by the dropwise addition of this solution to an acidic aqueous solution while stirring and (ii) dropwise addition of an acidic aqueous solution into the stirred organic solvent solution of the prepolymer and alkoxysilane(s). Organic solvents suitable for this purpose will preferably dissolve the prepolymer, alkoxysilane(s), and silicone-modified vinyl polymer that is the product of the hydrolysis and condensation and are exemplified by ether solvents such as diethyl ether and tetrahydrofuran, ketone solvents such as acetone, and methyl isobutyl ketone, aromatic hydrocarbon solvents such as benzene, toluene, and xylene, aliphatic hydrocarbon solvents such as hexane, heptane, and isooctane, alicyclic hydrocarbon solvents such as cyclohexane, fluorinated solvents such as α,α,α-trifluorotoluene, and hexafluoroxylene, and volatile silicone solvents such as hexamethyldisiloxane, hexamethylcyclotrisiloxane, and octamethylcyclotetrasiloxane. The prepolymer and alkoxysilane concentrations in the organic solvent are preferably in a range that yields a concentration of 10 to 80 weight % for the silicon-modified vinyl polymer. An aqueous solution of an acid such as sulfuric acid, nitric acid, or hydrochloric acid is used as the acidic aqueous solution. Among these, aqueous solutions of hydrochloric acid are preferred, in which case the hydrogen chloride concentration must be at least 5 wt %. The temperature during and after addition is preferably in the range from 0° to 120° C.

The silicone-modified vinyl polymer according to the present invention can be prepared by the method described above, but it can also be prepared by cohydrolyzing and condensing the combination of the acryloxy-functional alkoxysilane (B), the perfluoroalkyl-functional alkoxysilane (C), and optionally, the alkoxysilane (D) and the radically polymerizing the resulting hydrolysis condensate with the acrylate monomer (A) using a radical polymerization initiator as described above. The procedure for this cohydrolysis is exemplified by (i) dissolution of a mixture of the above-described silanes in organic solvent followed by the dropwise addition of this solution to an acidic aqueous solution while stirring and (ii) dropwise addition of an acidic aqueous solution into the stirred organic solvent solution of the silanes. Organic solvents useable for this purpose are exemplified by the organic solvents listed hereinabove. The silane concentration in the organic solvent is generally preferably in a range that yields a concentration of 10 to 80 weight % for the silicone-modified vinyl polymer. An aqueous solution of an acid such as sulfuric acid, nitric acid, or hydrochloric acid is used as the acidic aqueous solution. Among these, aqueous solutions of hydrochloric acid are preferred, in which case the hydrogen chloride concentration must be at least 5 wt %. The temperature during and after addition is preferably in the range from 0° to 120° C.

Characteristic features of the silicon-modified vinyl polymer according to this invention are its content in a single molecule of both vinyl resin and siloxane structures along with perfluoroalkyl groups having at least 4 carbon atoms being bonded to silicon across alkylene or alkyleneoxyalkylene. The silicone-modified vinyl polymer of this invention exhibits a low surface tension on the surfaces of various substrates and as a result can form a coating that has both excellent water repellency and excellent oil repellency. Other advantages to this coating are its excellent resistance to staining, excellent release properties, excellent heat resistance, excellent ageing resistance, and excellent chemical resistance. Thus, the silicone-modified vinyl polymer of this invention can be employed in various applications where such properties are critical and in particular is well suited for application as an agent that prevents the adhesion of water drops, snow, ice, oils and greases, thermoplastic powders, and resin micropowders, as a staining-resistant coating, or as a peelable or release coating. The invention will be explained in greater detail below through working examples, in which the values reported for the viscosity were measured at 25° C. in millipascal-seconds (mPa-s) (1 millipascal-second=1 centipoise).

EXAMPLE 1

0.2 grams (g) azobisisobutyronitrile and 22 (g) of xylene were introduced into a flask and heated to 95° C. with stirring. Into this was added dropwise a liquid mixture of 12.2 (g) of methyl methacrylate monomer and 5.5 (g) of a methacryloxypropyl-functional trimethoxysilane having the formula $CH_2=CCH_3CO_2(CH_2)_3Si(OCH_3)_3$ followed by stirring for 1 hour at 95° C. After the completion of stirring, the reaction was stopped by cooling to yield a colorless and transparent xylene solution of prepolymer with a viscosity of 100 mPa-s (prepolymer content=40 weight %). 40.3 (g) of this xylene solution of prepolymer and 18.9 (g) of a perfluoroalkyl-functional trimethoxysilane having the formula $C_8F_{17}C_2H_4Si(OCH_3)_3$ were introduced into a flask, and a mixture of 1.2 (g) of methanol and 1.2 (g) of 1/100N hydrochloric acid was added dropwise into the flask at room temperature with stirring. Stirring was continued for approximately 1 hour after the completion of addition, and the solvent component was then removed using an evaporator to give 21.5 (g) of a white solid. Analysis of this white solid by Fourier-transform infrared absorption analysis (FT-IR), $^{29}Si$ nuclear magnetic resonance analysis ($^{29}Si$-NMR), and $^{13}C$ nuclear magnetic resonance analysis ($^{13}C$-NMR) identified it as a silicone-modified vinyl polymer comprising units having the formula:

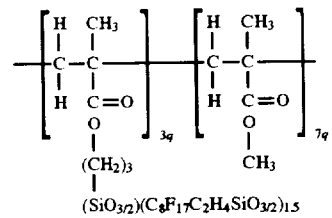

wherein q is an integer having a value of at least 1. This silicone-modified vinyl polymer had a weight-average molecular weight of 30,000 (polydimethylsiloxane calibration) and had a refraction index of 1.460 at 25° C.

EXAMPLE 2

5.5 (g) of a methacryloxypropyl-functional trimethoxysilane having the formula $CH_2=CCH_3CO_2(CH_2)_3Si(OCH_3)_3$, 18.9 (g) of a perfluoroalkyl-functional trimethoxysilane having the formula $C_8F_{17}C_2H_4Si(OCH_3)_3$, and 22 (g) of xylene were introduced into a flask. A mixture of 1.2 (g) methanol and 1.2 (g) of 1/100N hydrochloric acid was added dropwise into the flask at room temperature with stirring, and stirring was continued for approximately 1 hour after the completion of this addition. Washing with water and separation of the organic layer yielded 45.0 (g) of hydrolysis and condensation product.

0.2 (g) of azobisisobutyronitrile and 22 (g) of xylene were placed in another flask and heated to 95° C. with stirring, and a liquid mixture of 12.2 (g) of methyl methacrylate monomer and the above-described hydrolysis and condensation product was then added dropwise into the flask. This was followed by stirring at 95° C. for 1 hour. After the completion of stirring, the solvent component was removed using an evaporator to give 21.5 (g) of a white solid. Analysis of this white solid by FT-IR, $^{29}Si$-NMR, and $^{13}C$-NMR confirmed it to be a compound identical to the silicone-modified vinyl polymer synthesized in Example 1.

EXAMPLE 3

0.2 (g) of axobisiosbutyronitrile and 22 (g) of xylene were introduced into a flask and heated to 95° C. with stirring. Into this was added dropwise a liquid mixture of 12.2 (g) of methyl methacrylate monomer and 5.5 (g) of a methacryloxypropyl-functional trimethoxysilane having the formula $CH_2=CCH_3CO_2(CH_2)_3Si(OCH_3)_3$ followed by stirring for 1 hour at 95° C. After the completion of stirring, the reaction was stopped by cooling to yield a colorless and transparent xylene solution of prepolymer with a viscosity of 100 mPa-s (prepolymer content=40 weight %). 40.3 (g) of this xylene solution of prepolymer, 4.9 (g) of a perfluoroalkyl-functional trimethoxysilane having the formula $C_4F_9C_2H_4Si(OCH_3)_3$, and 2.4 (g) of dimethyldimethoxysilane having the formula $(CH_3)_2Si(OCH_3)_2$ were introduced into a flask, and a mixture of 1.2 (g) of methanol and 1.2 (g) of 1/100N hydrochloric acid was added dropwise into the flask at room temperature with stirring. Stirring was continued for approximately 1 hour after the completion of addition, and the solvent component was then removed using an evaporator to give 24.0 (g) of a white solid. Analysis of this white solid by FT-IR, $^{29}$Si-NMR, and $^{13}$C-NMR identified it as a silicone-modified vinyl polymer comprising units having the formula:

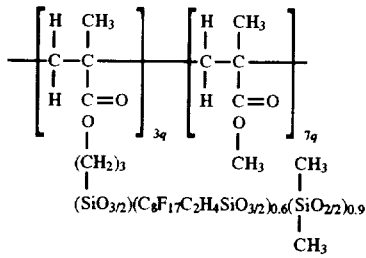

wherein q is an integer having a value of at least 1. This silicone-modified vinyl polymer had a weight-average molecular weight of 30,000 (polydimethylsiloxane calibration).

That which is claimed is:

1. A silicone-modified vinyl polymer comprising units having the formula:

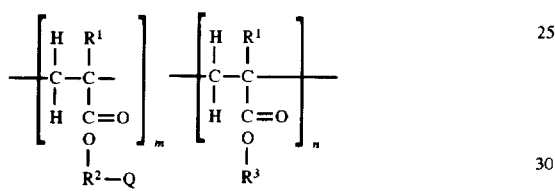

wherein $R^1$ is selected from the group consisting of hydrogen and an alkyl group, $R^2$ denotes a divalent hydrocarbon group, $R^3$ is selected from the group consisting of hydrogen, a substituted monovalent hydrocarbon group, and an unsubstituted monovalent hydrocarbon group, Q is a siloxane group having the formula

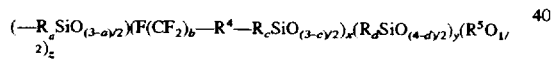

wherein R denotes a monovalent hydrocarbon group free of unsaturated bonding, $R^4$ is selected from the group consisting of an alkylene group and an alkyleneoxyalkylene group, $R^5$ is selected from the group consisting of hydrogen and an alkyl group, a is an integer from 0 to 2, b is an integer with a value of at least 4, c is an integer from 0 to 2, d is an integer from 0 to 3, x is a number greater than 0, y and z are each numbers with values of 0 or more, and m and n are each numbers from 1 to 10,000.

2. A polymer according to claim 1, wherein $R^1$ is selected from the group consisting of methyl, ethyl, propyl, and butyl.

3. A polymer according to claim 1, wherein $R^2$ is selected from the group consisting of methylene, ethylene, and propylene.

4. A polymer according to claim 1, wherein $R^3$ is selected from the group consisting of methyl, ethyl, propyl, butyl, and 2-hydroxypropyl.

5. A polymer according to claim 1, wherein R is selected from the group consisting of methyl, ethyl, propyl, butyl, pentyl, hexyl, heptyl, octyl, nonyl, decyl, hexadecyl, octadecyl, and phenyl.

6. A polymer according to claim 1, wherein $R^4$ is selected from the group consisting of ethylene, methylethylene, ethylethylene, propylethylene, butylethylene, propylene, butylene, 1-methylpropylene, pentylene, hexylene, heptylene, octylene, nonylene, decylene, ethyleneoxyethylene, ethyleneoxypropylene, ethyleneoxybutylene, propyleneoxyethylene, propyleneoxypropylene, propyleneoxybutylene, butyleneoxyethylene, and butyleneoxypropylene.

7. A polymer according to claim 1, wherein $R^5$ is selected from the group consisting of methyl, ethyl, propyl, butyl, and pentyl.

8. A polymer according to claim 1, wherein a has a value of 0, b has a value of from 4 to 12, and c has a value of 0.

9. A polymer according to claim 1, wherein the subscripts m and n are each numbers from 10 to 1,000 and the ratio of m:n is from 100:1 to 1:100.

10. A polymer according to claim 1, wherein Q is selected from the group consisting of

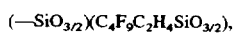

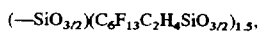

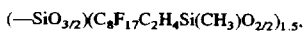

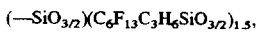

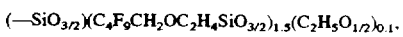

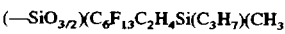

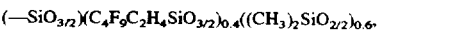

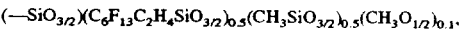

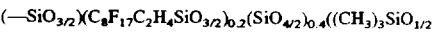

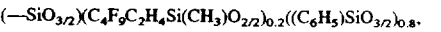

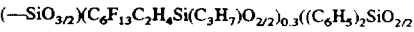

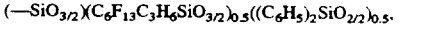

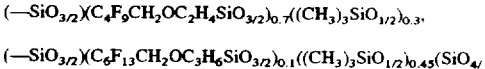

$(-SiO_{3/2})(C_4F_9CH_2OC_2H_4Si(CH_3)O_{2/2})_{0.5}((CH_3)SiO_{3/3})_{0.5}$, $(-SiO_{3/2})(C_6F_{13}CH_2OC_2H_4Si(CH_3)O_{2/2})_{0.5}((C_6H_5)SiO_{3/2})_{0.5}$, $(-SiO_{3/2})(C_8F_{17}C_2H_4SiO_{3/2})_{0.6}((CH_3)_2SiO_{2/2})_{0.9}$, and $(-SiO_{3/2})(C_8F_{17}CH_2OC_2H_4Si(CH_3)O_{2/2})_{0.5}((C_6H_5)_2SiO_{2/2})_{0.5}$.

11. A polymer according to claim 1, wherein the silicon-modified vinyl polymer is selected from the group consisting of (i) vinyl polymers comprising units having the formula:

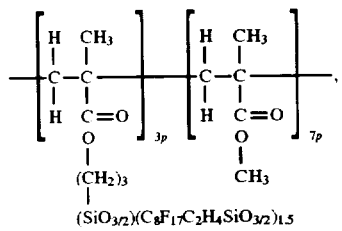

$(SiO_{3/2})(C_8F_{17}C_2H_4SiO_{3/2})_{1.5}$ (ii) vinyl polymers comprising units having the formula:

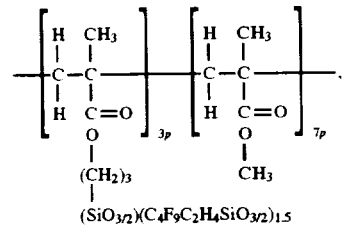

$(SiO_{3/2})(C_4F_9C_2H_4SiO_{3/2})_{1.5}$ (iii) vinyl polymers comprising units having the formula:

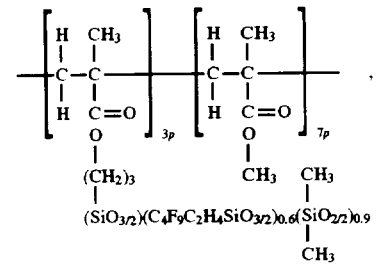

$(SiO_{3/2})(C_4F_9C_2H_4SiO_{3/2})_{0.6}(SiO_{2/2})_{0.9}$
 |
 $CH_3$ (iv) vinyl polymers comprising units having the formula:

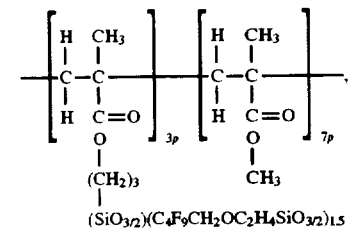

$(SiO_{3/2})(C_4F_9CH_2OC_2H_4SiO_{3/2})_{1.5}$ (v) vinyl polymers comprising units having the formula:

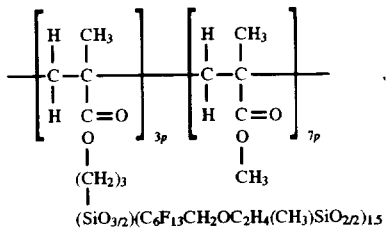

$(SiO_{3/2})(C_6F_{13}CH_2OC_2H_4(CH_3)SiO_{2/2})_{1.5}$ (vi) vinyl polymers comprising units having the formula:

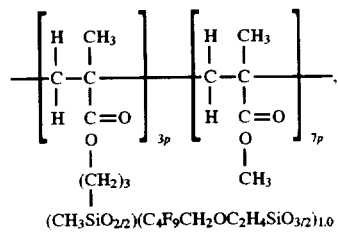

$(CH_3SiO_{2/2})(C_4F_9CH_2OC_2H_4SiO_{3/2})_{1.0}$ (vii) vinyl polymers comprising units having the formula:

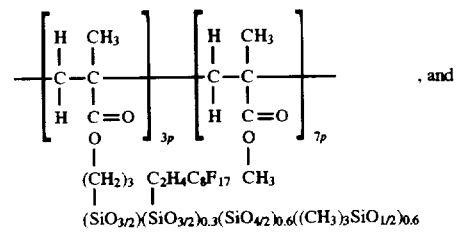

, and $(SiO_{3/2})(SiO_{3/2})_{0.3}(SiO_{4/2})_{0.6}((CH_3)_3SiO_{1/2})_{0.6}$ (viii) vinyl polymers comprising units having the formula:

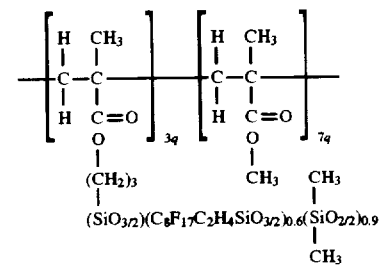

$(SiO_{3/2})(C_8F_{17}C_2H_4SiO_{3/2})_{0.6}(SiO_{2/2})_{0.9}$
 |
 $CH_3$ wherein p is an integer having a value of at least 1 and q is an integer having a value of at least 1.

12. A method of making a silicon-modified vinyl polymer comprising:

(I) radically polymerizing:

(A) at least one acrylate monomer having the general formula $CH_2=CR^1COOR^3$ and (B) at least one acryloxy-functional alkoxysilane having the general formula $CH_2=CR^1COO-R^2-R_aSi(OR^6)_{3-a}$ wherein $R^1$ is selected from the group consisting of hydrogen and alkyl groups. $R^2$ denotes divalent hydrocarbon groups. $R^3$ is selected from the group consisting o hydrogen, substituted monovalent hydrocarbon groups, and unsubstituted monovalent hydrocarbon groups, $R^6$ denotes a $C_1$ to $C_8$ alkyl group, R denotes monovalent hydrocarbon group free of unsaturated bonding, and a is an integer from 0 to 2;

(II) combining the product of (I) with:
(C) at least one perfluoroalkyl-functional alkoxysilane having the general formula

$F(CF_2)_b-R^4-R_cSi(OR^6)_{3-c}$; and optionally (D) at least one alkoxysilane having the general formula

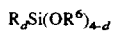

$R_dSi(OR^6)_{4-d}$ wherein R is as defined above, $R^4$ denotes an alkylene or alkyleneoxyalkylene group, $R^6$ is as defined above, b is an integer with a value of at least 4, c is an integer from 0 to 2, and d is an integer from 0 to 3; and (III) partially hydrolyzing and condensing the product of (II).

13. A method according to claim 12, wherein (I) comprises mixing component (A), component (B), a solvent, and a radical polymerization initiator.

14. A method according to claim 13, wherein the radical polymerization initiator is selected from the group consisting of benzoyl peroxide, dichlorobenzoyl peroxide, di-tert-butyl peroxide, 2,5-di(peroxybenzoate)hex-3-yne, 1,3-bis(tert-butylperoxyisopropyl)benzene, tert-butyl perbenzoate, azobisisobutyronitrile, and dimethylazobutyrate.

15. A method according to claim 12, wherein (III) comprises:
(i) dissolving the produce of (II) in an organic solvent;
(ii) combining the produce of (i) with an aqueous solution of an acid.

* * * * *